(12) United States Patent　　(10) Patent No.: US 8,313,632 B2
Honda et al.　　(45) Date of Patent: *Nov. 20, 2012

(54) PROCESS OF MAKING AN OPTICAL LENS

(75) Inventors: Yoshiaki Honda, Souraku-gun (JP); Takayuki Nishikawa, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 911 days.

This patent is subject to a terminal disclaimer.

(21) Appl. No.: 11/920,545

(22) PCT Filed: May 16, 2006

(86) PCT No.: PCT/JP2006/310099
§ 371 (c)(1), (2), (4) Date: Nov. 16, 2007

(87) PCT Pub. No.: WO2006/123816
PCT Pub. Date: Nov. 23, 2006

(65) Prior Publication Data
US 2009/0101509 A1　　Apr. 23, 2009

(30) Foreign Application Priority Data

May 18, 2005　(JP) ................. 2005-145952
Dec. 22, 2005　(JP) ................. 2005-371071
Dec. 22, 2005　(JP) ................. 2005-371072

(51) Int. Cl.
*C25D 5/02* (2006.01)
(52) U.S. Cl. ........................ 205/124; 205/123
(58) Field of Classification Search .......... 205/123, 205/124; 438/689, 770
See application file for complete search history.

(56) References Cited

U.S. PATENT DOCUMENTS

| 5,565,084 | A | 10/1996 | Lee et al. |
| 5,804,090 | A | 9/1998 | Iwasaki et al. |
| 2004/0184155 | A1 | 9/2004 | Kornblit et al. |

FOREIGN PATENT DOCUMENTS

| GB | 1530509 | 11/1978 |
| JP | 52-004785 | 1/1977 |

(Continued)

OTHER PUBLICATIONS

Office Action dated Jan. 23, 2007, issued on the Japanese patent application No. 2006-139419 and the English translation thereof.
Abstract of Notification of Reasons for Refusal dated Aug. 17, 2010, for Japanese Application: JP 2006-018196.
U.M. Meschder, 3D Structuring of c-Si using Porous Silicon as Sacrificial Material, Proceedings of the 2002 2nd IEEE Conference on Nanotechnology, Aug. 26, 2002, p. 33-34.

(Continued)

*Primary Examiner* — Luan Van
(74) *Attorney, Agent, or Firm* — Edwards Wildman Palmer LLP

(57) ABSTRACT

A semiconductor substrate is anodized to be shaped into an optical lens. Prior to being anodized, the substrate is finished with an anode pattern on its bottom surface so as to be consolidated into a unitary structure in which the anode pattern is precisely reproduced on the substrate. The anodization utilizes an electrolytic solution which etches out oxidized portion as soon as it is formed as a result of the anodization, to thereby develop a porous layer in a pattern in match with the anode pattern. The anode pattern brings about an in-plane distribution of varying electric field intensity by which the porous layer develops into a shape complementary to a desired lens profile. Upon completion of the anodization, the semiconductor substrate is shaped into the lens by etching out the porous layer and the anode pattern from the substrate.

18 Claims, 10 Drawing Sheets

FOREIGN PATENT DOCUMENTS

| | | |
|---|---|---|
| JP | 55-013960 | 1/1980 |
| JP | 62-172731 | 7/1987 |
| JP | 05-109691 | 4/1993 |
| JP | 08-264505 | 10/1996 |
| JP | 10-079524 | 3/1998 |
| JP | 2000-263556 | 9/2000 |
| JP | 2000263556 A * | 9/2000 |
| JP | 2002-214404 | 7/2002 |
| JP | 2003-024753 | 1/2003 |
| JP | 2004-280117 A | 10/2004 |
| JP | 2004/299366 | 10/2004 |

OTHER PUBLICATIONS

Written Opinion of the International Searching Authority for PCT/JP2006/310099 (5 sheets).

Notification of Reasons for Refusal for Japanese Patent Application No. 2006-018196 issued Apr. 19, 2011.

Philippines Examination of Report dated May 22, 2012, issued for the Philippines patent application No. 12007502485.

* cited by examiner

FIG. 11
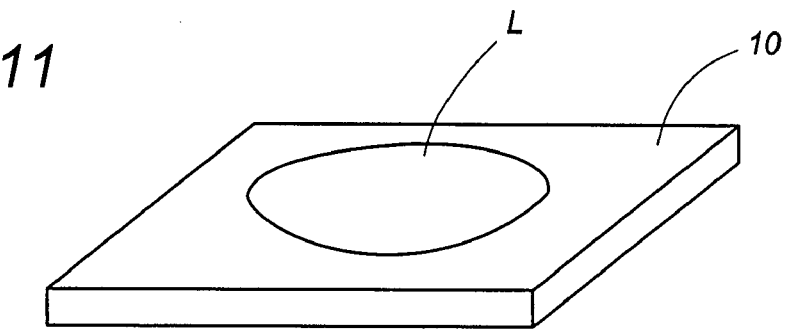
FIG. 12A
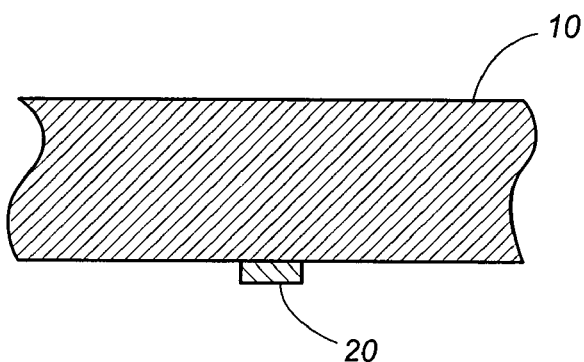
FIG. 12B
FIG. 12C
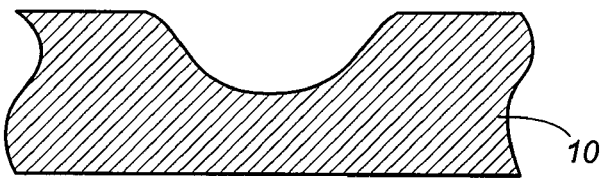

PROCESS OF MAKING AN OPTICAL LENS

TECHNICAL FIELD

The present invention is directed to a process for fabricating an optical lens from a body of semiconductor substrate.

BACKGROUND ART

One prior art is disclosed in Japanese patent publication No. 55-13960 which is directed to a process of making a micro structure in the surface of a semiconductor substrate by anodization. The anodization is used for oxidizing the top surface of the substrate in an electrolyte solution. The oxidizing proceeds selectively in the top surface in a pattern corresponding to an arrangement of an anode. The anode is formed separately from the substrate and is held in contact with the bottom surface of the substrate, leaving oxidized portions partially in the top surface of the substrate. Thereafter, the oxidized portions are removed to leave a convex in the top surface of the substrate. This technique is sufficient for forming a relatively thin profile or surface irregularity with a small depth. However, it is found practically difficult to give a thick profile with a smoothly curved surface as is required in fabricating the optical lens, since the oxidized portions act as a dielectric barrier blocking an anodizing current through the substrate to inhibit the growth of the oxidized portions in the thickness of the substrate. Accordingly, in order to obtain the thick profile with an accurately designed curved contour, it has to be required not only to repeat steps of anodizing the top surface to partially form the oxidized portions followed by removing the oxidized portions, but also to use differently arranged anodes in each step. In this sense, the above prior art is found not to be available for fabrication of the optical lens with sufficient thickness.

Another prior art is disclosed in Japanese patent publication No. 2000-263556 which is directed to a process of making a mold for a micro optical lens. The mold is fabricated by steps of preparing a semiconductor substrate, providing a dielectric mask on a top surface of the substrate, forming one or more openings in the mask, placing the substrate in an electrolytic solution, and anodizing a portion in the top surface not covered by the mask to convert the portion into a porous zone. Thereafter, the porous zone is removed to leave a rounded convex in the top surface of the substrate. An ultraviolet curable resin is placed in the convex and is cured therein to obtain a convex lens. Although the prior art discloses the formation of the porous zones, the process relies upon the mask with the opening so that the porous zone develops isotropically from the center of each opening. Accordingly, the resulting rounded convex is limited to have substantially a uniform radius of curvature. With this limitation, the process cannot be not adapted to fabricate optical lens having non-uniform radius of curvature or sophisticated surface profile.

Further, when forming a small lens by use of the mask with tiny opening, the porous layer can be formed successfully around the tiny opening at an initial stage. However, bubbles appearing in the initial stage are difficult to escape out through the tiny opening and are likely to remain in the porous zones, which inhibits the entry of the electrolyte solution in the substrate and therefore impedes further development of the porous zone. With this result, the porous zones could not be controlled to give an intended predetermined profile, failing to reproduce the lens of accurate profile. When, on the other hand, forming a relatively large lens with the use of the mask having a correspondingly large opening, it is likely that the anodization proceeds in the center of the opening at a rate considerably faster than at the periphery of the opening and the rate is difficult to be controlled. Therefore, it is difficult to give an accurately controlled surface profile to the porous zone and the resulting lens.

Moreover, because of that the mask is deposited on the side of the substrate from which the anodization proceeds, and the that the mask is normally made of SiN or the like having a relatively small thickness, for example, 1 μm or less, the mask may be easily broken due to a stress developing as the porous zone grows. Also in this respect, the process relying upon the mask on the anodization side of the substrate is not found satisfactory in fabricating the lens.

DISCLOSURE OF THE INVENTION

In view of the above problem, the present invention has been accomplished to provide an improved process of fabricating an optical lens. The process according to the present invention utilizes a semiconductor substrate having a flat top surface and a flat bottom surface opposed to each other, and includes the steps forming an anode on the bottom surface, placing the semiconductor substrate in an electrolyte solution. Then, the steps are followed by flowing a current between the anode and a cathode within the solution to convert the top surface of the substrate to a varying depth from portions to portions, leaving a resulting porous layer in the top surface, and removing the porous layer from the substrate to leave a curved surface on the top surface. The process is characterized in that the anode is deposited and on the bottom surface to give a consolidated structure, and is configured to give a predetermined distribution of a electric field intensity which varies from portion to portions of the substrate across the top and bottom surfaces of the substrate, thereby providing the porous layer having the varying depth in match with the distribution of the electric field intensity.

With the above process, the anode is made integral with the substrate so as to accurately give the distribution of the electric field intensity in exact concordance with a pattern of the anode, thereby making it possible to precisely shape the porous layer and the resulting curved surface. In addition, since the anode is configured to give the predetermined distribution of the electric field intensity varying from portions to portions of the substrate, it is easy to give continuously varying radius of curvature to the resulting curved surface. Further, because of that the anodization proceeds from the top surface of the substrate which is exposed entirely to the electrolyte solution, i.e., not covered or masked by a material restricting the anodization, and that the anodization rate is controlled principally by the anode pattern on the bottom surface of the substrate, it is easy to develop the porous layer of accurately controlled contour or profile and therefore give the correspondingly accurate surface profile to the resulting lens.

Accordingly, the process can be best utilized to fabricate the optical lens, especially a non-spherical lens with precisely controlled surface profile.

Although the anode is preferably removed from the substrate after forming the porous layer, it may remain fixed to the substrate when fabricating a specific lens such as a concave reflector lens in which the anode does not interfere with lens performance.

In one version of the present invention, the anode is formed partially on the bottom surface of the substrate to give one or more circular anode pattern which defines the predetermined distribution of the electric field intensity, and is responsible for realizing the curved surface having a concave profile at a portion opposed to the circular anode pattern. Therefore, it is easy to fabricate a concave lens of desired radius of curvature by suitably designing the anode pattern.

In another version of the present invention, the anode is deposited on the bottom surface of the substrate to have one or more circular openings. The circular opening in the anode makes the distribution of the electric field intensity which is looser towards the center of the opening than from the periphery of the opening, thereby forming the porous layer of gradually varying thickness and giving a convex profile to the top surface at a portion opposed to the circular opening by removing the porous layer.

Instead of making the circular opening in the anode, a dielectric circular mask may be formed partially on the bottom surface behind the anode so as to make the like distribution of the electric field intensity for giving a convex profile to the top surface at a portion opposed to the circular mask. The circular mask may be formed by the steps of providing a dielectric layer on the entire bottom surface of the; and removing a portion of the dielectric layer to leave the circular mask.

The semiconductor substrate is preferably made of silicon, and the dielectric layer is made of silicon oxide or silicon nitride. Also, the electrolyte solution is preferred to include an aqueous solution of hydrogen fluoride.

Further, the present invention is advantageous in fabricating a concavo-convex lens, a double-convex, and a double-concavo, in addition to plano-convex or plano-concave lens. For example, the concavo-convex lens is made firstly by making the concave profile in the top surface of the substrate and by adding the steps of forming an additional anode with an additional circular opening on the top surface with the additional circular opening being configured to be coaxial with the concave profile already formed in the top surface, placing the semiconductor substrate in the electrolyte solution, flowing a current between the additional anode and the cathode within the solution to advance oxidizing the bottom surface of the substrate to a varying depth from portions to portions, leaving an additional oxidized layer in the bottom surface; and removing the additional oxidized layer from the substrate to leave a convex profile on the bottom surface.

Likewise, the double-concave lens can be successfully fabricated by making the concave profile in the top surface of the substrate followed by forming an additional circular anode partially on the top surface with the additional circular anode being coaxial with the concave profile already formed in the top surface, placing the semiconductor substrate in the electrolyte solution, flowing a current between the additional circular anode and the cathode within the solution to advance oxidizing the bottom surface of the substrate to a varying depth from portions to portions, leaving an additional oxidized layer in the bottom surface; and removing the additional oxidized layer from the substrate to leave a concavo profile on the bottom surface.

The double-convex lens can be also fabricated successfully by making the convex profile in the top surface of the substrate followed by forming an additional anode having an additional circular opening on the top surface with the additional circular opening being configured to be coaxial with the convex profile already formed on the top surface, placing the semiconductor substrate in the electrolyte solution, flowing a current between the additional anode and the cathode within the solution to advance oxidizing the bottom surface of the substrate to a varying depth from portions to portions, leaving an additional oxidized layer in the bottom surface; and removing the oxidized layer from the substrate to leave another convex profile on the bottom surface.

Alternatively, the concavo-convex lens can be formed by making the convex profile followed by forming an additional circular anode partially on the top surface with the additional circular anode being coaxial with the convex profile already formed on the top surface, placing the semiconductor substrate in the electrolyte solution, flowing a current between the additional circular anode and the cathode within the solution to advance oxidizing the bottom surface of the substrate to a varying depth from portions to portions, leaving an additional oxidized layer in the bottom surface; and removing the additional oxidized layer from the substrate to leave a concavo profile on the bottom surface.

Further, the present invention can be successfully adapted to fabricate a cylindrical lens or the like non-circular lens. For example, the anode is formed to give a non-circular anode pattern when forming the non-circular concave profile. A non-circular concave lens can be also formed by use of the anode which is formed by adding an electrically conductive layer on the bottom surface of the substrate, and by removing a portion of the conductive layer to form a non-circular opening in the conductive layer, which is responsible for giving a convex profile to the top surface at a portion opposed to the circular opening.

Alternatively, the non-circular concave lens is fabricated by use of the anode which covers the bottom surface of the substrate over a dielectric non-circular mask formed partially on the bottom surface.

Moreover, it is preferably to decrease the current in the final stage of developing the porous layer so as to provide a smooth finish to the lens.

These and still other advantageous features of the present invention will become more apparent from the following detailed explanation when taking in conjunction with the attached drawings.

BRIEF DESCRIPTION OF THE DRAWINGS

FIG. 11 is a perspective view of a piano-concave lens fabricated in accordance with a second embodiment of the present invention;

FIG. 12A to 12C are sectional views illustrating the steps of forming the lens;

FIG. 17 is a perspective view illustrating a non-circular lens which can be fabricated in accordance with the present invention; and.

BEST MODE FOR CARRYING OUT THE INVENTION

Figure 1:
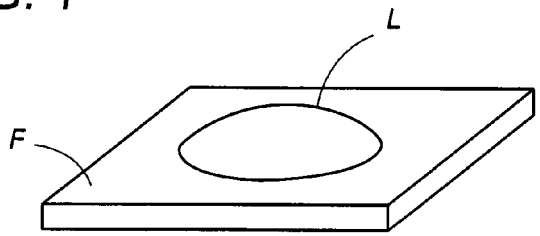
FIG. 1 is a perspective view of a plano-convex lens fabricated in accordance with a first embodiment of the present invention.
Figure 3:
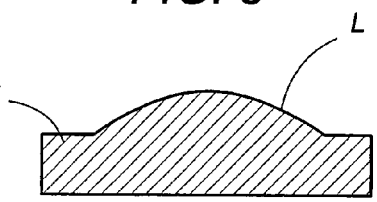
FIG. 3 is a sectional view of the lens.
Figure 2:
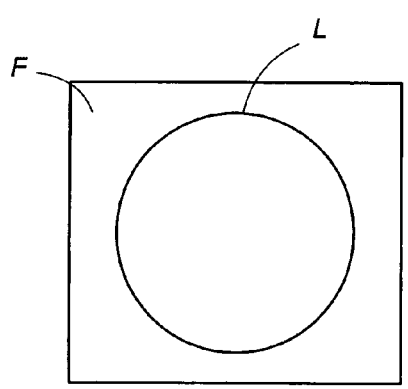
FIG. 2 is a top view of the lens.
Figure 4:
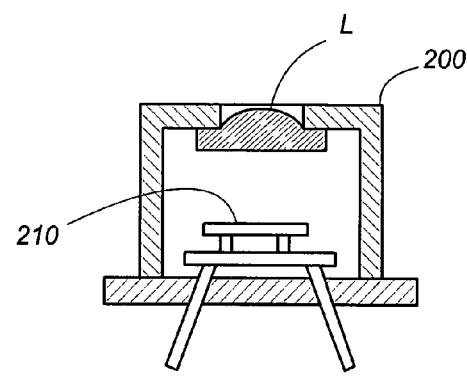
FIG. 4 is a sectional view illustrating a device in which the above lens is utilized.

Referring to FIGS. 1 to 5, the present invention is now explained for fabrication of a plano-convex lens in accordance with a first embodiment of the present invention. As shown in FIGS. 1 to 3, the lens L is configured to have an integral flange F which is utilized for mounting the lens in a device such as an optical sensor 200, which is one typical application of the lens and is configured to have a sensing element such as a pyroelectric element 210 to receive the light through the lens, as shown in FIG. 4.

Figure 5:
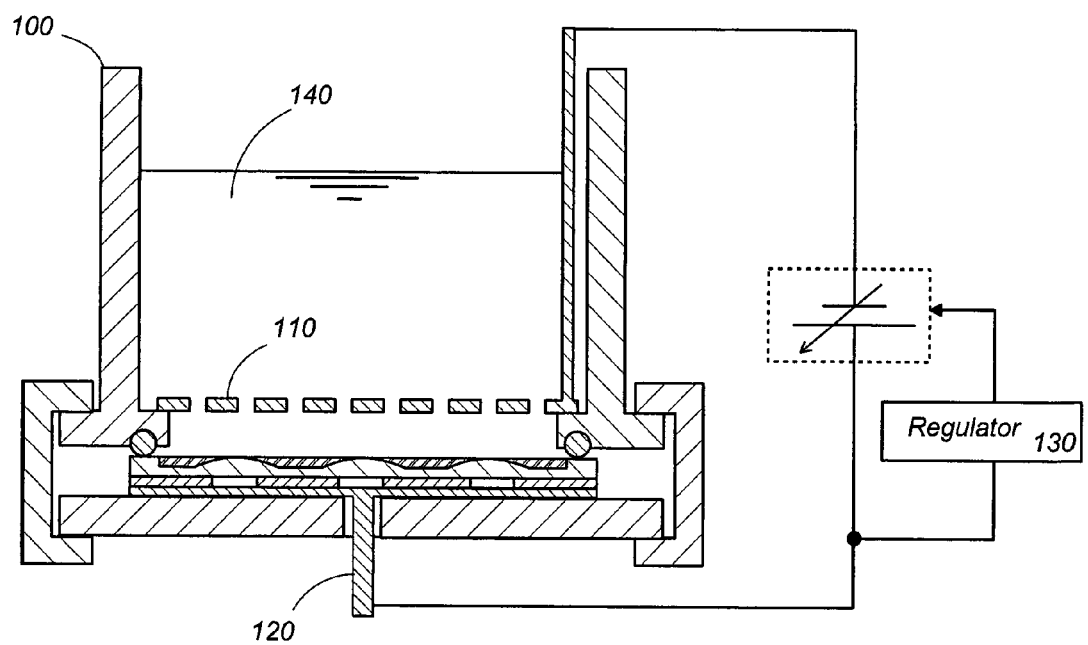
FIG. 5 is a sectional view of an anodizing apparatus utilized for making the process of the present invention.

The lens is made from a semiconductor material such as, silicon (Si), germanium (Ge), silicon carbide (SiC), gallium arsenide (GaAs), gallium phosphide (GaP), and indium phosphide (InP). In this embodiment, the semiconductor substrate 10 of p-type Si is utilized to fabricate the plano-convex lens by selective anodization of the substrate. The anodization is made by use of an anodizing apparatus 100 which, as shown in FIG. 5, is configured to place the substrate 10 within a volume of an electrolyte solution 140, and which is configured to be equipped with a regulator 130 for regulation of an electric current flowing between an anodic electrode 120 and a cathode 110 immersed in the solution. The anodic electrode 120 is held in contact with the bottom surface of substrate 10 in order to advance the anodization to a varying extent in the top surface opposed to the cathode 110. The anodic electrode 120 and cathodes 110 are both made of platinum.

Figure 6A:
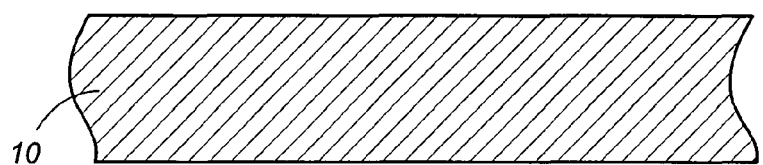
FIGS. 6A to 6E are sectional views illustrating the steps of forming the lens.
Figure 6B:
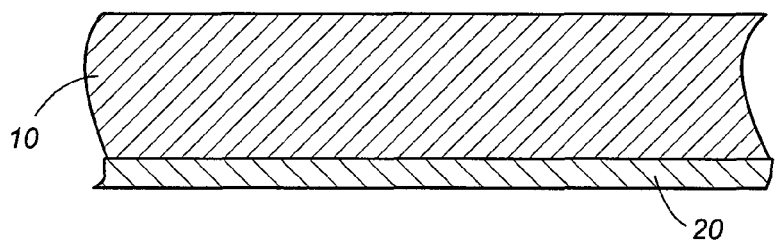
Figure 6C:
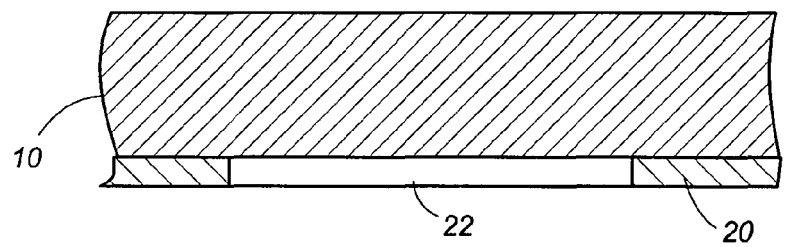
Figure 6D:
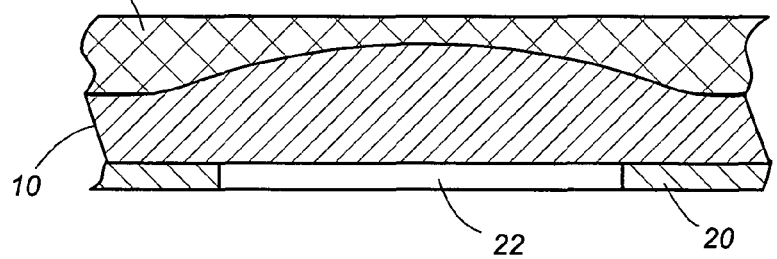
Figure 6E:
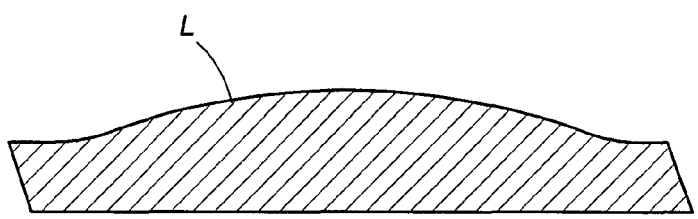

In this embodiment, the substrate 10 is selected to have a low resistance of several ohm centimeters (Ω·cm) to several hundreds ohm centimeters (Ω·cm). For example, a 0.5 mm thick flat p-type Si substrate 10 of 80 Ω·cm is shaped into the lens through the steps of FIGS. 6A to 6E. After being washed and cleaned, the substrate 10 is processed to have an electrically conductive layer 20 on the entire bottom surface (FIG. 6B). The conductive layer 20 is made of aluminum, for example, and is deposited by spattering or like technique on the substrate 10 to have a uniform thickness of 1 μm. Then, the layer 20 is etched to leave a circular opening 22 of 2 mm diameters in match with a diameter of the lens to be fabricated to give a consolidated structure in which the conductive layer 20 defines an anode pattern integrated to the substrate 10 (FIG. 6C). Subsequently, the substrate 10 is immersed within the electrolyte solution 140 in the anodizing apparatus 100 with the conductive layer 20 or the anode pattern in contact with the anodic electrode 120 and is followed by receiving an electric current flowing between the anode pattern and the cathode 110 so as to anodize the top surface of the substrate selectively in correspondence to the anode pattern, thereby developing a porous layer 30 in the top surface of the substrate 10 (FIG. 6D). The electric current is regulated by the regulator 130 to have a predetermined current density of 30 mA/cm², for example, and continue for a predetermined period of 120 minutes for example. Thereafter, the porous layer 30 and the conductive layer 20 are etched out to obtain the lens (FIG. 6E).

The electrolyte solution utilized is an aqueous solution of hydrogen fluoride (HF) and ethanol mixed in a suitable ratio. In the anodization process, the following chemical reactions take place:

$$Si + 2HF + (2-n)h^+ \rightarrow SiF_2 + 2H^+ + n \cdot e^-$$

$$SiF_2 + 2HF \rightarrow SiF_4 + 2H^+ + H_2$$

$$SiF_4 + 2HF \rightarrow SiH_2F_6$$

where $h^+$ denotes a hole and $e^-$ denotes an electron.

As soon as the Si substrate is anodically oxidized, the oxidized portion is removed by reaction with the electrolyte solution so as to leave the porous layer 30 in the surface of the substrate 10. Accordingly, the anodization proceeds without being retarded by the oxidized portion, which makes it possible to develop the porous layer 30 having a greater depth, and therefore enable to fabricate the lens of relatively great thickness.

Figure 7A:
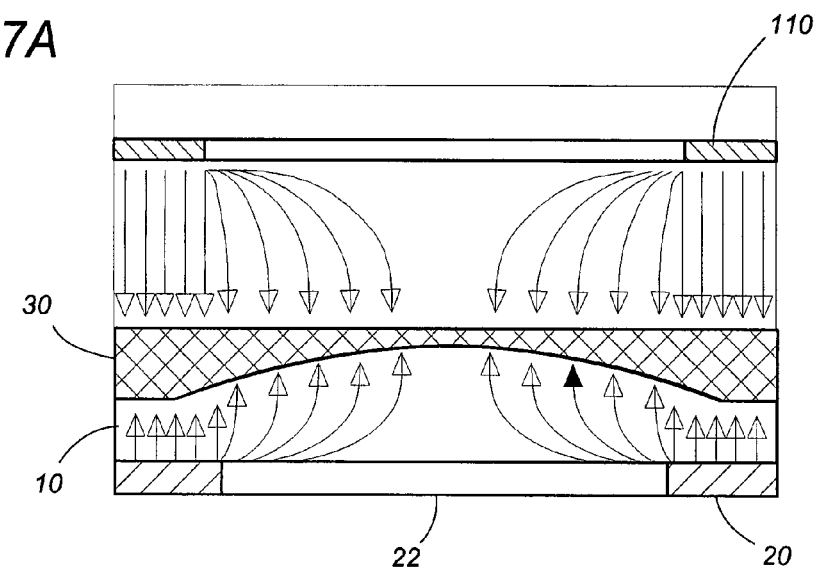
FIGS. 7A and 7B are schematic views illustrating electric field intensity distribution developed in the process of forming the lens.

As schematically shown in FIG. 7A, an in-plane electric field strength or current density is variably distributed in coincidence with the anode pattern. In the figure, the lines with black arrows indicate paths of the positive current flowing through the substrate 10, while the lines with white arrows indicate the paths of the electrons flowing through the substrate 10. Since the in-plane current density becomes denser towards the periphery of the opening 22 than at the center of the opening, the resulting porous layer 30 has a continuously varying depth which is greater towards the periphery of opening 22 than at the center of the opening. Consequently, the plano-convex lens is obtained by removal of the porous layer 30 and the anode pattern or the conductive layer 20. The distribution of the in-plane electric field strength will be determined primarily by the anode pattern, and secondarily by the resistivity and the thickness of the substrate 10, resistance of the electrolyte solution 140, a distance between the substrate 10 and the cathode 110, and a planar configuration of the cathode 110 (i.e. cathode arrangement in a plane parallel to the substrate). Accordingly, it is readily possible to give any desired lens profile by suitably selecting these parameters in combination with the anode pattern. It should be noted here that since the anodization proceeds to develop the porous layer continuously without being retarded by otherwise appearing oxidized portions in the substrate, the thick lens can be easily fabricated in a single anodization process, which enhances flexibility of the lens design.

Figure 7B:
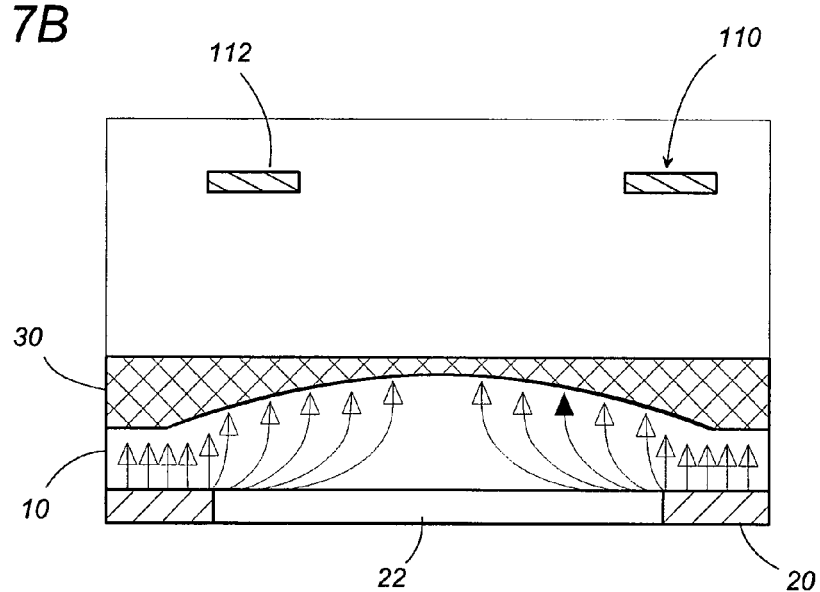

The resistance of the electrolytic solution can be adjusted by the concentration of the aqueous solution of hydrogen fluoride (HF) and/or by a mixing ratio of HF to ethanol. The cathode 110 may be designed to have a pattern in exact coincident with the anode pattern as shown in FIG. 7A, or to have a pattern in which the opposing cathode elements 112 are offset slightly towards the center of the opening 22 of the anode pattern in a plane parallel to the substrate 10, as shown in FIG. 7B. The offset amount can be adjusted in relation with the current density as well as the distance to the substrate 10.

In the anodization process, the regulator 130 acts to keep the current density at a constant level. However, it is preferably to decrease the current density gradually in a final stage of the anodization process in order to correspondingly decrease the rate of developing the porous layer 30. With this technique, the resulting lens can have a more smooth surface finish. The regulation of the current density is made by monitoring the current level or voltage level.

The removal of the porous layer 30 and the conductive layer 20 can be made by use of an alkali solution such as KOH, NaOH and TMAH (tetramethyl ammonium hydroxide) or HF solution.

Example

Figure 8:
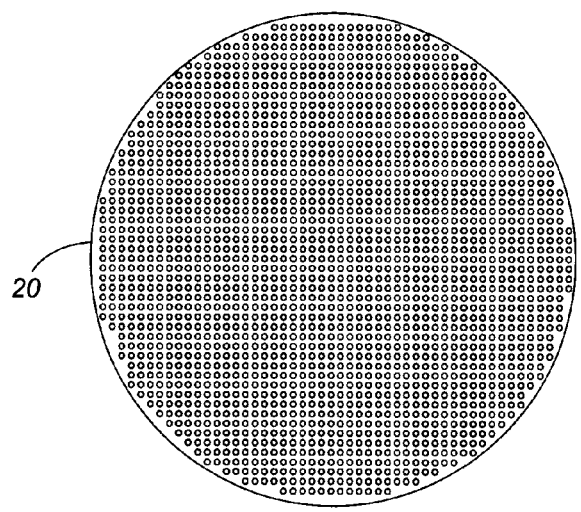
FIG. 8 illustrates an anode pattern formed on the bottom surface of the substrate.
Figure 9:
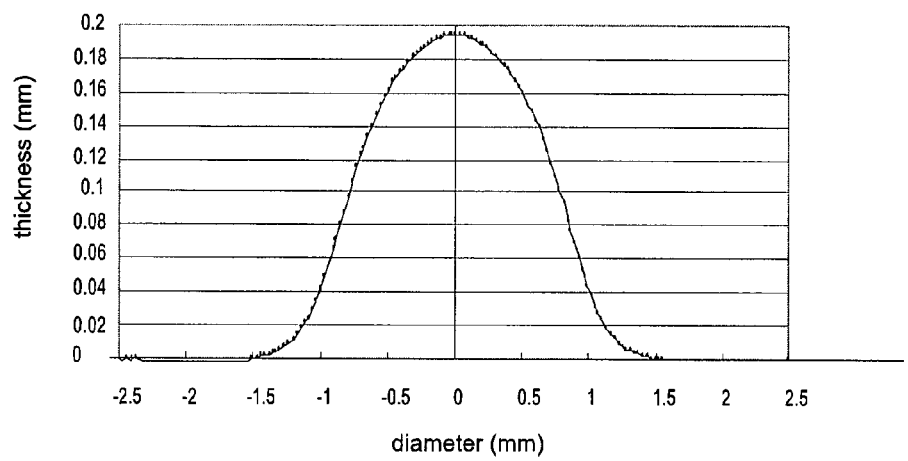
FIG. 9 is a graph illustrating a sectional surface profile of the lens fabricated in accordance with an example of the above embodiment.

A 100 mm diameter p-type Si substrate 10 of 0.5 mm thick and 80 Ω·cm resistivity was formed on its bottom surface with a 1 µm thick aluminum conductive layer 20 by spattering. After sintering the conductive layer 20 at 420° C. for 20 minutes, the layer 20 was masked by photolithography with a resist pattern having a plurality of windows of 2 mm diameters. Then, the unmasked portion of the conductive layer 20 was etched out to form a plurality of 2 mm diameter openings in the conductive layer, as shown in FIG. 8. After being removed of the resist pattern, the substrate 10 was placed in the anodizing apparatus of FIG. 5 containing the electrolytic solution comprised of an 1:1 ratio mixture of a 50% aqueous solution of hydrogen fluoride (HF) and ethanol. Then, the substrate was anodized at current density of 30 mA/cm$^2$ for 3 hours. The resulting porous layer 30 was found to have a 0.3 mm thick at the portion corresponding to the conductive layer 20 and to have a decreasing thickness towards the center of the opening 20 in a plane parallel to the substrate. The porous layer 30 and the conductive layer 20 are then etched out by a 10% aqueous solution of KOH over a period of 15 minutes, thereby forming a plurality of plano-convex lenses. The substrate 10 was then cut out into a plurality of the lens. The etching rate of removing the porous layer 30 was more than 10 times than that of removing the substrate. Accordingly, only the porous layer 30 was selectively etched out while keeping the substrate 10 intact. Thus formed lens were each configured to have a lens thickness of 0.195 mm with a profile shown in FIG. 9.

Figure 10:
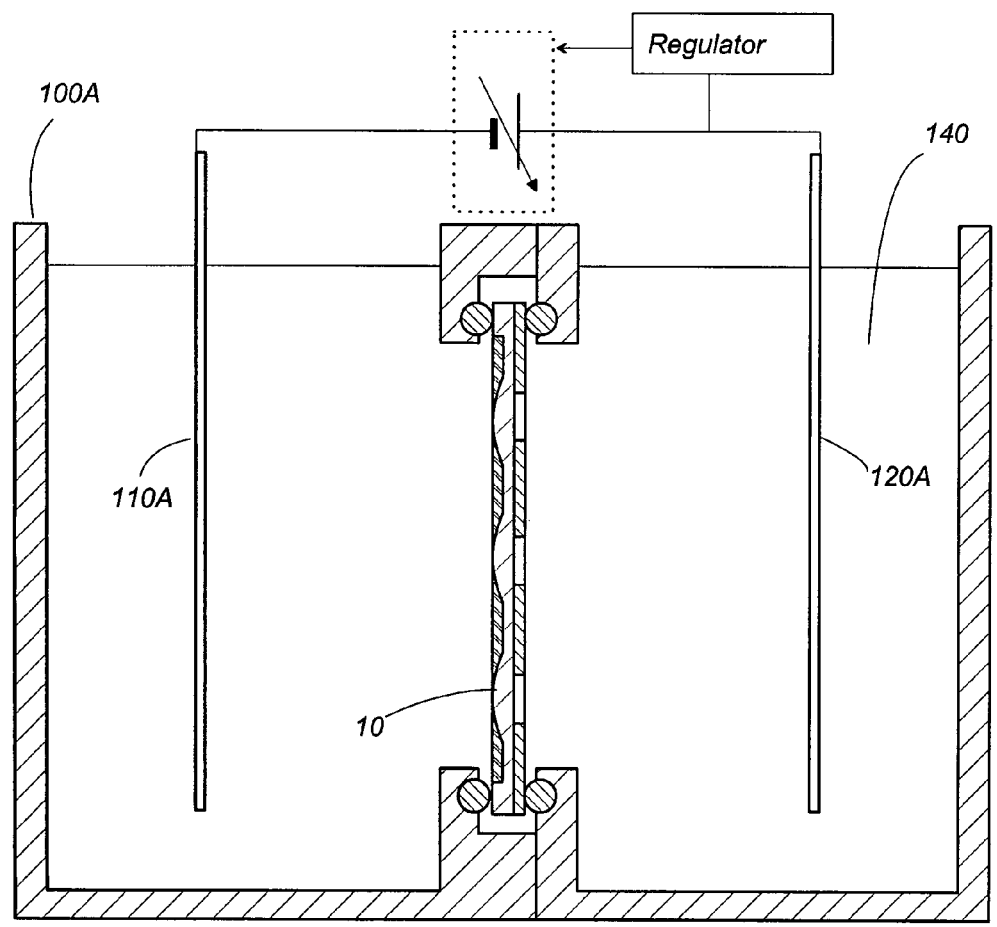
FIG. 10 is a section of another anodizing apparatus which is utilized for making the process of the present invention.
Figure 13A:
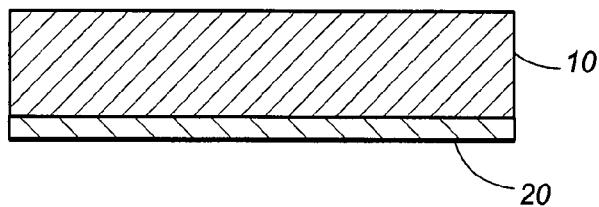
FIG. 13A to 13G are sectional views illustrating the steps of forming a double-convex lens in accordance with a third embodiment of the present invention.
Figure 13B:
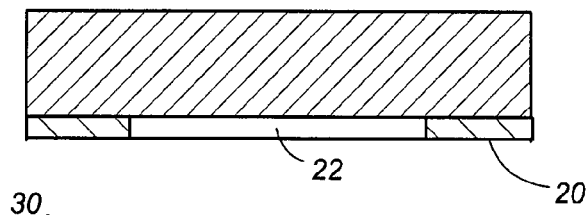
Figure 13C:
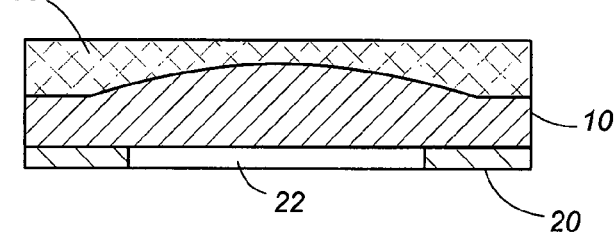
Figure 13D:
Figure 13E:
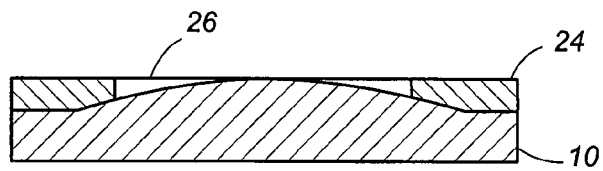
Figure 13F:
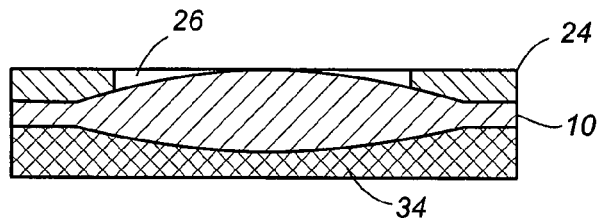
Figure 13G:
Figure 14A:
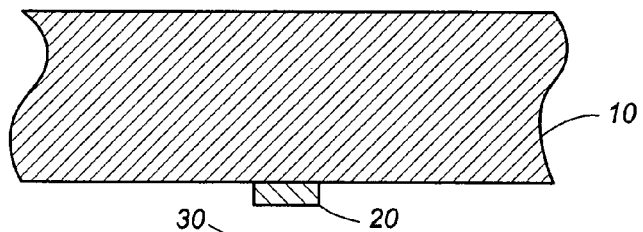
FIG. 14A to 14F are sectional views illustrating the steps of forming a double-concave lens in accordance with a fourth embodiment of the present invention.
Figure 14B:
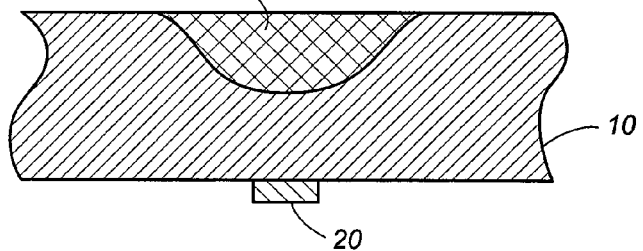
Figure 14C:
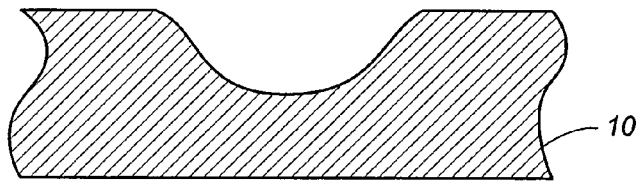
Figure 14D:
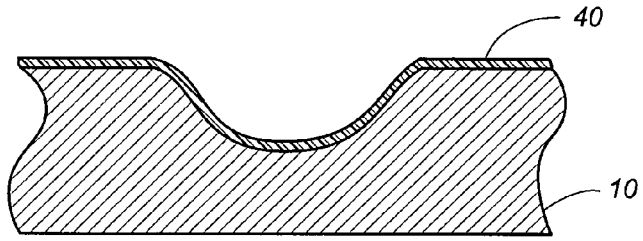
Figure 14E:
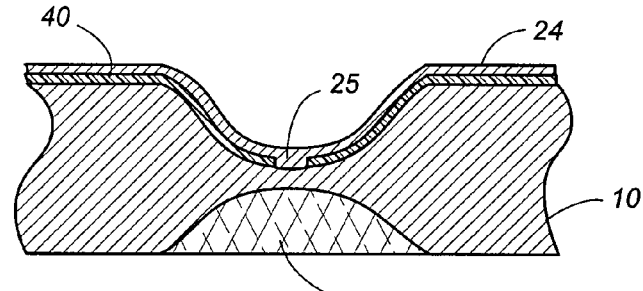
Figure 14F:
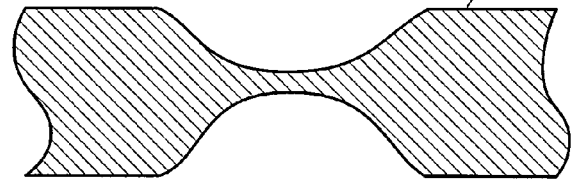
Figure 15A:
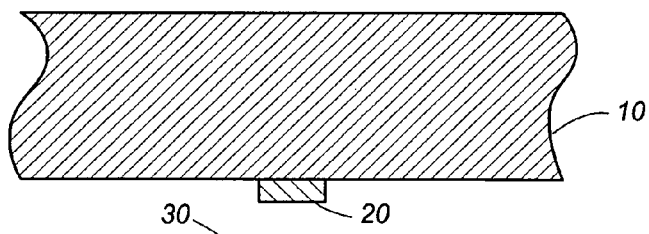
FIG. 15A to 15F are sectional views illustrating the steps of forming a concavo-convex lens in accordance with a fifth embodiment of the present invention.
Figure 15B:
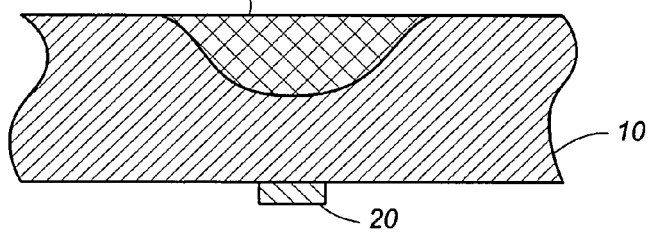
Figure 15C:
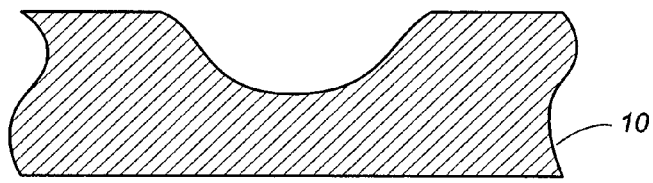
Figure 15D:
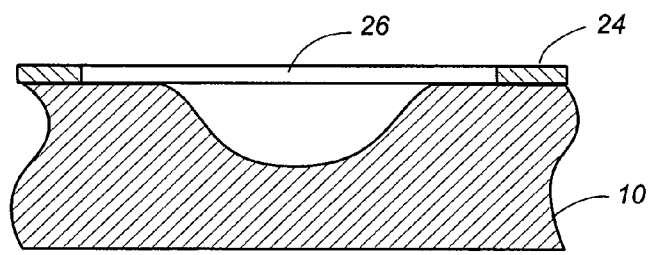
Figure 15E:
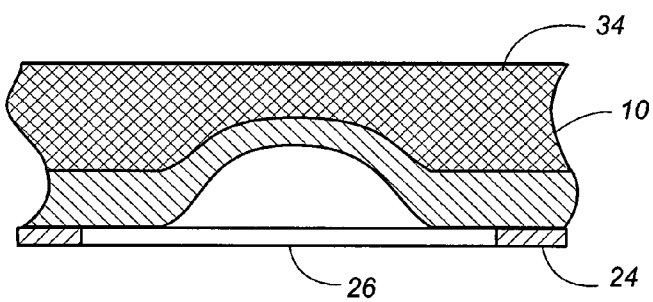
Figure 15F:
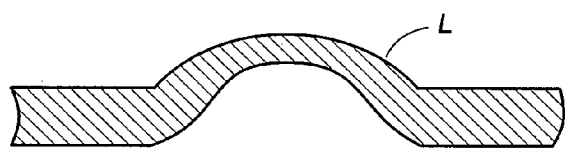
Figure 16A:
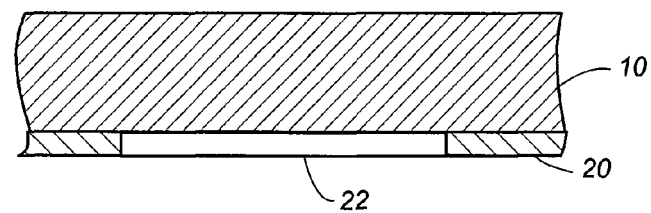
FIG. 16A to 16E are sectional views illustrating the steps of forming a concavo-convex lens in accordance with a sixth embodiment of the present invention.
Figure 16B:
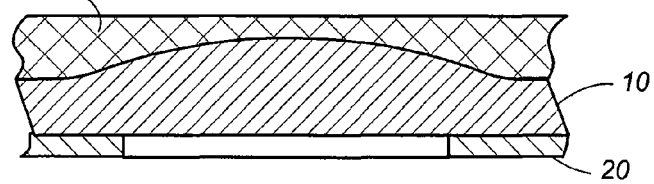
Figure 16C:
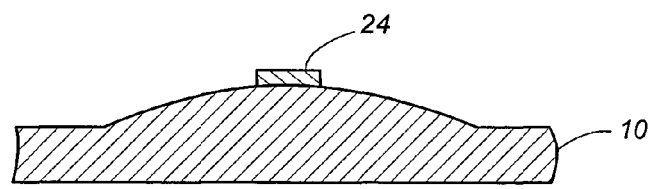
Figure 16D:
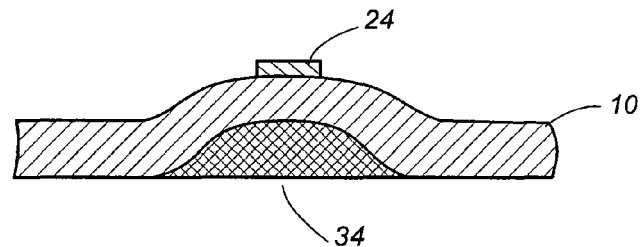
Figure 16E:
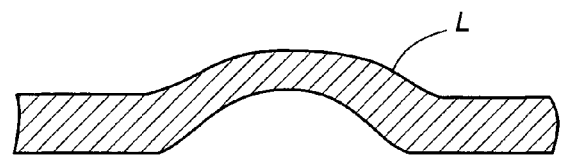

FIG. 10 illustrates another anodizing apparatus 100A which is equally utilized for fabrication of the lens. The apparatus 100A is basically identical with that of FIG. 5 except that the substrate 10 is disposed centrally within the electrolytic solution 140, and that the cathode 110A and the anodic electrode 120A are disposed on the opposite sides of the vertically supported substrate 10.

Second Embodiment

FIGS. 11 and 12 illustrate the process of fabricating a plano-concave lens L in accordance with the second embodiment of the present invention. In the present invention, the semiconductor substrate 10 is formed on its bottom surface with an anode pattern composed of a plurality of circular anodes 20 in a pattern analogous to that shown in FIG. 8. For simplicity, only single anode 20 is shown in FIGS. 12A and 12B. Each anode 20 is responsible for forming a concave profile in the opposing top surface of the substrate 10 by anodization and by removal of the resulting porous layers 30 in the like manner as discussed with reference to the first embodiment. That is, during the anodizing process, the porous layer 30 develops in the top surface at a portion opposed to each anode 20 to have a depth which is greater towards the center of each electrode 20 than at the periphery thereof, as shown in FIG. 12B. Then, the porous layer 30 and the anode 20 are etched out to uncover the concave profile in the top surface of the substrate 10, as shown in FIG. 12C. Thereafter, the substrate 10 is cut out into individual pieces of the plano-convex lenses.

Third Embodiment

FIG. 13 illustrates the process of fabricating a double-convex lens L in accordance with the third embodiment of the present invention which is similar to the first embodiment except for inclusion of additional anodization process. Firstly, the substrate 10 is formed in its top surface with the convex profile through the steps as described in the first embodiment and as shown in FIGS. 13A to 13D. Then, an additional conductive layer 24 with a plurality of additional circular openings 26 is deposited on the top surface with each of the additional circular openings 26 being disposed in concentric with the already formed convex profile as shown in FIG. 13E, in which only one additional circular opening 26 is shown for simplicity. Subsequently, the substrate 10 is anodized to develop an additional porous layer 34 in the bottom surface of the substrate 10, as shown in FIG. 13F. The additional porous layer 34 is etched out together with the additional conductive layer 24 to obtain the double-convex lens L, as shown in FIG. 13G. In this manner, the double convex lens can be obtained simply by adding another anodization process.

Fourth Embodiment

FIG. 14 illustrates the process of fabricating a double-concavo lens L in accordance with the fourth embodiment of the present invention which is similar to the second embodiment except for adding another anodization process. As shown in FIGS. 14A to 14C, the substrate 10 is formed with a plurality of concave profiles (only one being shown for simplicity) in the top surface by the process described in the second embodiment. Then, as shown in FIG. 14D, the entire top surface of the substrate 10 is covered by a dielectric mask 40 of a suitable thickness, for example, 200 nm by known film forming technique such as CVD (chemical vapor deposition). The mask 40 may be made of a material selected from a group consisting of SiO$_2$, SiN, and SiC. Thereafter, the mask 40 is etched in the center of each concave profile to leave an opening thereat. An additional conductive layer 24 of aluminum is then deposited over the entire mask 40 to provide a center anode 25 in the opening of the mask for direct contact with the center of each concave profile, as shown in FIG. 14E. Subsequently, the substrate 10 is anodized to develop an additional porous layer 34 in the bottom surface which is concentric with the center anode 25. Finally, the additional porous layer 34 is etched out together with the conducive layer 24 and the mask 40 to obtain the double-concavo lenses L which are cut into the individual pieces, as shown in FIG. 14F.

Fifth Embodiment

FIG. 15 illustrates the process of fabricating a concavo-convex lens in accordance with the fifth embodiment of the present invention which is similar to the first and second embodiments except for making the anodization twice to develop the porous layers in the top and bottom surfaces. As shown in FIGS. 15A to 15C, the substrate 10 is formed with a plurality of concave profiles (only one being shown for simplicity) in the top surface of the substrate 10 in much the same manner as in the second embodiment. Then, an additional conductive layer 24 is deposited on the top surface of the substrate 10 followed by being etched to leave a plurality of additional circular opening 26 each in concentric with the already formed concave profile, as shown in FIG. 15D. Each opening 26 is dimensioned t have a diameter slightly greater than that of the corresponding concave profile. Subsequently, the substrate 10 is anodized to develop an additional porous layer in the bottom surface each in correspondence with each concave profile, as shown in FIG. 15E, after which the additional layers 34 are etched out together with the additional conductive layer 24 to give the final structure of the concavo-convex profile as shown in FIG. 15F.

Sixth Embodiment

FIG. 16 illustrates an alternative process of fabricating a concavo-convex lens in accordance with the sixth embodiment of the present invention which is similar to the fifth embodiment except for the order of the anodization processes. As shown in FIGS. 16A to 16C, the substrate 10 is formed with a plurality of convex profiles (only one being shown for simplicity) in the top surface of the substrate 10 in much the same manner as in the first embodiment. Then, an additional conductive layer 24 is deposited on top of each convex profile as shown in FIG. 16C. Each additional layer 24 is dimensioned to have a diameter less than that of each corresponding convex profile and is responsible for developing an additional porous layer 34 concentric with the convex profile in the anodization, as shown in FIG. 16D. Each of the resulting additional porous layers 34 is etched out together with the additional conductive layers 24 to give a final structure of the concavo-convex profile as shown in FIG. 16E.

Figure 17:
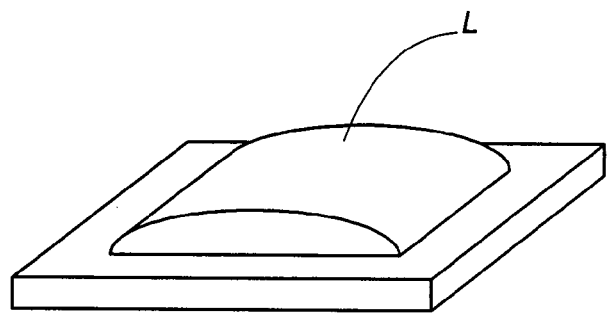

FIG. 17 illustrates a cylindrical lens L which can be equally fabricated in accordance with the present invention. When making such non-circular lens, the opening in the conductive layer or the mask covered by the conductive layer is shaped to be rectangular in a plane parallel to the surface of the substrate.

Figure 18:
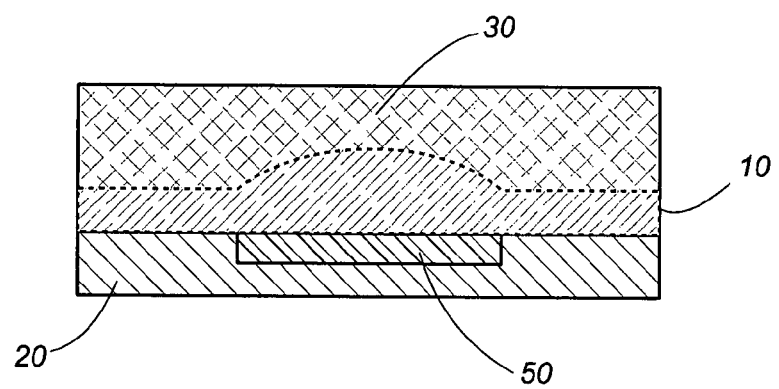
FIG. 18 is a sectional view illustrating the step of using a dielectric mask for fabrication of a convex lens in accordance with a modification of the above embodiment.

Although the convex profile is explained to be formed by use of the conductive layer with a circular opening in the above embodiment, the present invention should be interpreted not to be limited thereto but to encompass a scheme of using a dielectric mask 50 in combination with the conductive layer 20, as shown in FIG. 18. The dielectric mask 50 is deposited on the bottom surface of the substrate 10 partially at a portion corresponding to the intended convex profile, while the conductive layer 20 is deposited over the mask 50 to cover the surface of the substrate entirely, thereby achieving a distribution of varying electric filed intensity for developing the porous layer 30 of a configuration complementary to the convex profile in the anodizing process. The dielectric mask is selected from a group consisting of $SiO_2$, SiN, and SiC and is deposited on the substrate by know technique such as CVD or the like.

Further, the present invention should be interpreted to be not limited to the use of the silicon substrate but to allow the use of other semiconductor materials in combination with specific electrolyte solution as shown in the table below.

| Semiconductor material | Electrolytic solution | Masking material |
|---|---|---|
| Si | $HF:C_2H_5OH$ | SiN |
| Ge | $HCl:C_2H_5OH$ | $SiO_2$, SiN, SiC |
| SiC | $HF:C_2H_5OH$ | SiN |
| GaAs | HCl | $SiO_2$, SiN, SiC |
| GaP | $H_2SO_4$ | $SiO_2$, SiN, SiC |
| InP | HCl | $SiO_2$, SiN, SiC |

In the above table, the mask material available in combination of the semiconductor material and the electrolytic solution are listed.

The invention claimed is:

1. A process of fabricating an optical lens, said process comprising the steps of:
    preparing a semiconductor substrate having a flat top surface and a flat bottom surface opposed to each other;
    forming a patterned anode on said bottom surface,
    placing said semiconductor substrate in an electrolyte solution;
    flowing a current between said anode and a cathode within said solution to convert the top surface of said substrate to a varying depth from portions to portions, leaving a porous layer in said top surface; and
    removing said porous layer from said substrate to leave a curved optical lens surface on said top surface,
    characterized in that
    said anode is deposited on said bottom surface to give a consolidated structure and is configured to give a predetermined distribution of an electric field intensity which varies from portion to portions of said substrate across said top and bottom surfaces of said substrate, the anode patterned to thereby provide said porous layer having the varying depth in match with the distribution of said electric field intensity,
    wherein said anode is formed by the steps of:
    depositing an electrically conductive layer on the bottom surface of said substrate; and
    removing a portion of said conductive layer to form a circular opening in said conductive layer,
    said circular opening being responsible for giving a convex profile to the top surface at a portion opposed to said circular opening.

2. The process as set forth in claim 1, wherein said anode is removed from said substrate after forming said porous layer.

3. The process as set forth in claim 2, wherein said porous layer is formed over the entire top surface of said substrate.

4. A process of fabricating an optical lens, said process comprising the steps of:
    preparing a semiconductor substrate having a flat top surface and a flat bottom surface opposed to each other;
    forming an anode on said bottom surface;
    placing said semiconductor substrate in an electrolyte solution;
    flowing a current between said anode and a cathode within said solution to convert the top surface of said substrate to a varying depth from portions to portions, leaving a porous layer in said top surface;
    removing said porous layer from said substrate to leave a curved surface on said top surface;
    characterized in that
    said anode is deposited on said bottom surface to give a consolidated structure and is configured to give a predetermined distribution of an electric field intensity which varies from portion to portions of said substrate across said top and bottom surfaces of said substrate, thereby providing said porous layer having the varying depth in match with the distribution of said electric field intensity,
    wherein said anode is formed partially on said bottom surface to give a circular anode pattern which defines said predetermined distribution of said electric field intensity, giving a concave profile to the top surface at a portion opposed to said anode;
    forming an additional circular anode partially on said top surface with said additional circular anode being coaxial with said concave profile already formed in said top surface;

placing said semiconductor substrate in said electrolyte solution;

flowing a current between said additional circular anode and said cathode within said solution to advance oxidizing the bottom surface of said substrate to a varying depth from portions to portions, leaving an additional oxidized layer in said bottom surface; and removing said additional oxidized layer from said substrate to leave a concave profile on said bottom surface.

5. A process of fabricating an optical lens, said process comprising the steps of:

preparing a semiconductor substrate having a flat top surface and a flat bottom surface opposed to each other;

forming an anode on said bottom surface;

placing said semiconductor substrate in an electrolyte solution;

flowing a current between said anode and a cathode within said solution to convert the top surface of said substrate to a varying depth from portions to portions, leaving a porous layer in said top surface; and removing said porous layer from said substrate to leave a curved surface on said top surface;

characterized in that said anode is deposited on said bottom surface to give a consolidated structure and is configured to give a predetermined distribution of an electric field intensity which varies from portion to portions of said substrate across said top and bottom surfaces of said substrate, thereby providing said porous layer having the varying depth in match with the distribution of said electric field intensity, wherein said anode is formed on the bottom surface of said substrate over a dielectric circular mask which is formed partially on said bottom surface to realize said predetermined distribution of said electric field intensity, giving a convex profile to the top surface at a portion opposed to said circular mask.

6. The process as set forth in claim 5, wherein said circular mask is formed by the steps of:

providing a dielectric layer on the entire bottom surface of said substrate; and removing a portion of said dielectric layer to leave said circular mask.

7. The process as set forth in claim 5, wherein said semiconductor substrate is made of silicon, and said dielectric layer is made of silicon oxide or silicon nitride.

8. The process as set forth in claim 4, further including the steps of:

forming an additional anode with an additional circular opening on said top surface with said additional circular opening being configured to be coaxial with said concave profile already formed in said top surface;

placing said semiconductor substrate in said electrolyte solution;

flowing a current between said additional anode and said cathode within said solution to advance oxidizing the bottom surface of said substrate to a varying depth from portions to portions, leaving an additional oxidized layer in said bottom surface; and removing said additional oxidized layer from said substrate to leave a convex profile on said bottom surface.

9. The process as set forth in claim 1, further including the steps of:

forming an additional anode having an additional circular opening on said top surface with said additional circular opening being configured to be coaxial with said convex profile already formed on said top surface;

placing said semiconductor substrate in said electrolyte solution;

flowing a current between said additional anode and said cathode within said solution to advance oxidizing the bottom surface of said substrate to a varying depth from portions to portions, leaving an additional oxidized layer in said bottom surface; and removing said oxidized layer from said substrate to leave another convex profile on said bottom surface.

10. The process as set forth in claim 1, further including the steps of:

forming an additional circular anode partially on said top surface with said additional circular anode being coaxial with said convex profile already formed on said top surface;

placing said semiconductor substrate in said electrolyte solution;

flowing a current between said additional circular anode and said cathode within said solution to advance oxidizing the bottom surface of said substrate to a varying depth from portions to portions, leaving an additional oxidized layer in said bottom surface; and removing said additional oxidized layer from said substrate to leave a concave profile on said bottom surface.

11. The process as set forth in claim 1, wherein said semiconductor substrate is made of silicon, and said electrolyte solution includes an aqueous solution of hydrogen fluoride.

12. The process as set forth in claim 1, wherein said semiconductor substrate is made of a p-type semiconductor.

13. The process as set forth in claim 1, wherein said anode is formed partially on said bottom surface to give a non-circular anode pattern which defines said predetermined distribution of said electric field intensity, giving a concave profile to the top surface at a portion opposed to said anode.

14. A process of fabricating an optical lens, said process comprising the steps of:

preparing a semiconductor substrate having a flat top surface and a flat bottom surface opposed to each other;

forming an anode on said bottom surface;

placing said semiconductor substrate in an electrolyte solution;

flowing a current between said anode and a cathode within said solution to convert the top surface of said substrate to a varying depth from portions to portions, leaving a porous layer in said top surface; and removing said porous layer from said substrate to leave a curved surface on said top surface;

characterized in that said anode is deposited on said bottom surface to give a consolidated structure and is configured to give a predetermined distribution of an electric field intensity which varies from portion to portions of said substrate across said top and bottom surfaces of said substrate, thereby providing said porous layer having the varying depth in match with the distribution of said electric field intensity, wherein said anode is formed on the bottom surface of said substrate over a dielectric non-circular mask which is formed partially on said bottom surface to realize said predetermined distribution of said electric field intensity, giving a convex profile to the top surface at a portion opposed to said non-circular mask.

15. The process as set forth in claim 1, wherein said current is regulated to decrease in a final stage of developing the porous layer.

16. The process as set forth in claim 1, wherein said substrate is selected to have a resistance of several ohm centimeters ($\Omega \cdot cm$) to several hundreds ohm centimeters ($\Omega \cdot cm$).

17. The process as set forth in claim 5, further including the steps of:
    forming an additional anode having an additional circular opening on said top surface with said additional circular opening being configured to be coaxial with said convex profile already formed on said top surface;
    placing said semiconductor substrate in said electrolyte solution;
    flowing a current between said additional anode and said cathode within said solution to advance oxidizing the bottom surface of said substrate to a varying depth from portions to portions, leaving an additional oxidized layer in said bottom surface; and
    removing said oxidized layer from said substrate to leave another convex profile on said bottom surface.

18. The process as set forth in claim 5, further including the steps of:
    forming an additional circular anode partially on said top surface with said additional circular anode being coaxial with said convex profile already formed on said top surface;
    placing said semiconductor substrate in said electrolyte solution;
    flowing a current between said additional circular anode and said cathode within said solution to advance oxidizing the bottom surface of said substrate to a varying depth from portions to portions, leaving an additional oxidized layer in said bottom surface; and
    removing said additional oxidized layer from said substrate to leave a concave profile on said bottom surface.

* * * * *